June 6, 1961

C. E. KINSING ET AL 2,987,357

BATTERY CHARGER MOUNTING FOR INDUSTRIAL TRUCKS

Filed Feb. 24, 1959

INVENTORS
CHARLES E. KINSING
CHESTER T. WILLIAMS
BY John E. Olupher
ATTORNEY

United States Patent Office 2,987,357
Patented June 6, 1961

2,987,357
BATTERY CHARGER MOUNTING FOR INDUSTRIAL TRUCKS
Charles E. Kinsing, Trenton, N.J., and Chester T. Williams, Penndel, Pa., assignors to Gould-National Batteries, Inc., St. Paul, Minn., a corporation of Delaware
Filed Feb. 24, 1959, Ser. No. 795,094
8 Claims. (Cl. 312—201)

This invention relates to an improved battery charger mounting which is particularly adapted for use on industrial trucks.

Compactness of design is particularly important in industrial trucks which are to be used where floor space is limited, as in many factories and warehouses. Safety regulations pertaining to such trucks prohibit the use of accessory equipment which projects from the exterior of the trucks. Accordingly, in many trucks of the charger equipped, battery powered type the charger has been enclosed in the battery compartment. This has the disadvantage of making it necessary to insulate or otherwise protect the battery from the high temperatures attained by the charger during charging. To avoid damage to the battery resulting from overheating and to conserve space within the truck walls, it has been proposed to place the charger on the top of or above the battery. By so locating the charger, the heat generated during charging may be dissipated readily but, heretofore, the placing of a charger on the battery cover or housing has interfered with the periodic servicing of the battery, such as testing the electrolyte and voltage, checking the electrolyte level and adding liquid when required.

It is, therefore, an object of our invention to facilitate the charging and servicing of industrial truck batteries by providing novel, low-cost means for mounting a charger on the cover of a storage battery housing, including cover sections adapted to be opened selectively to allow access to the several portions of the battery and means for slidably connecting the charger to the upper side of the cover sections whereby to permit movement of the charger from one cover section to another as required for access to the battery elements.

Our invention also includes certain other novel features of construction which will be more fully pointed out in the following specification and claims.

Referring to the accompanying drawing which illustrates our invention by way of example and not for the purpose of limitation:

Figure 4:
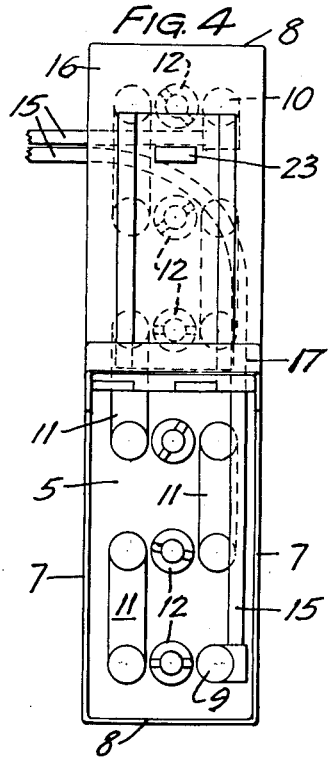
FIG. 4 is a plan view showing the housing and battery separate from the charger and with one of the cover sections in open position.

In the drawing an industrial battery of common type is indicated by the numeral 5 and a suitable metal housing therefor is indicated generally at 6. This housing is rectangular, having parallel side walls 7, end walls 8 and a suitable bottom (not shown). The battery shown in FIG. 4 has positive and negative terminal posts indicated at 9 and 10 respectively, intercell connectors 11 and a plurality of removable vent plugs 12 which may be removed for inspection of the electrolyte level and for adding liquid to the several cells.

A battery charger indicated generally at 13 is adapted to be supported directly above the battery 5 and may be supplied with alternating current from a suitable source through conductors in a cord 14. The outlet current from the charger 13 is conducted to the battery 5 through cables 15 which extend through a suitable opening in the upper margin of one of the walls 7.

Figure 1:
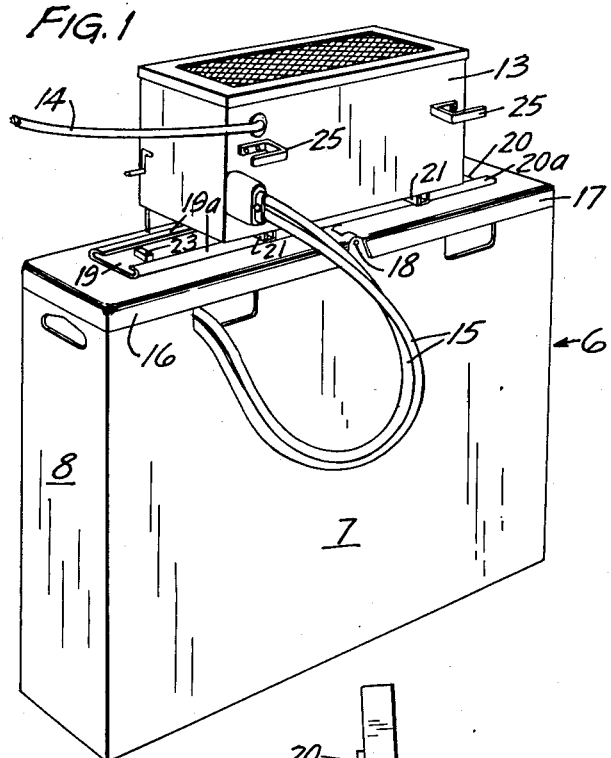
FIGURE 1 is a perspective view showing our improved charger mounting on a battery housing of common type.

Our improved charger mounting includes a plurality of cover sections indicated at 16 and 17 respectively, hingedly connected to the side walls 7 of the battery housing so that either of these sections may be raised to the open position from a closed position by pivoting it about a hinge pin 18. Extending along the normally upper side of the cover sections 16 and 17 are guide means comprising rail members 19 and 20 having flanges 19a and 20a respectively disposed in parallel, spaced relation to the upper surfaces of the cover sections. Although separate from the guide member 19, the member 20 is disposed in end to end continuation of the member 19 when the cover sections are in their horizontal, closed positions indicated in FIGS. 1 and 3.

Figure 3:
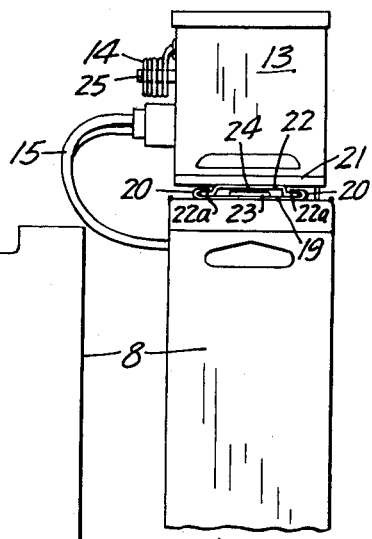
FIG. 3 is an end view of the mounting and battery housing with the cover sections in closed position.

Means are provided on the bottom of the charger 13 for connecting it to the guide rail members 19 and 20. The connecting means include a pair of bars 21 extending in parallel relation one to the other across the bottom of the charger 13, being rigidly connected thereto, and a pair of rail members 22 extending in parallel relation to the rail members 19 and 20 and having outwardly projecting flanges 22a adapted to slidably interlock with the flanges 19a and 20a, as best shown in FIG. 3. The rail members 22 are preferably integral parts of a metal plate which is welded or otherwise secured to the bottom surfaces of the cross bars 21. The guide rails 19 may be formed integrally with a metal plate which is welded or otherwise secured to the cover section 16 and the members 20 may be similarly formed and connected to the cover section 17.

To limit longitudinal movement of the charger relative to the cover sections 16 and 17, stops 23 are secured to the cover sections 16 and 17 between the rail members 19 and 20 and a third stop 24 is secured to the bottom of the charger 13 at a central point. These stops coact one with another to guard against inadvertent sliding of the charger out of engagement with the guide rails 19 or 20. One of the stops 23 is preferably connected by detachable means, such as bolts or screws, to its supporting cover section 19 or 20 so that the charger may be separated from the battery housing for repair or replacement.

Figure 2:
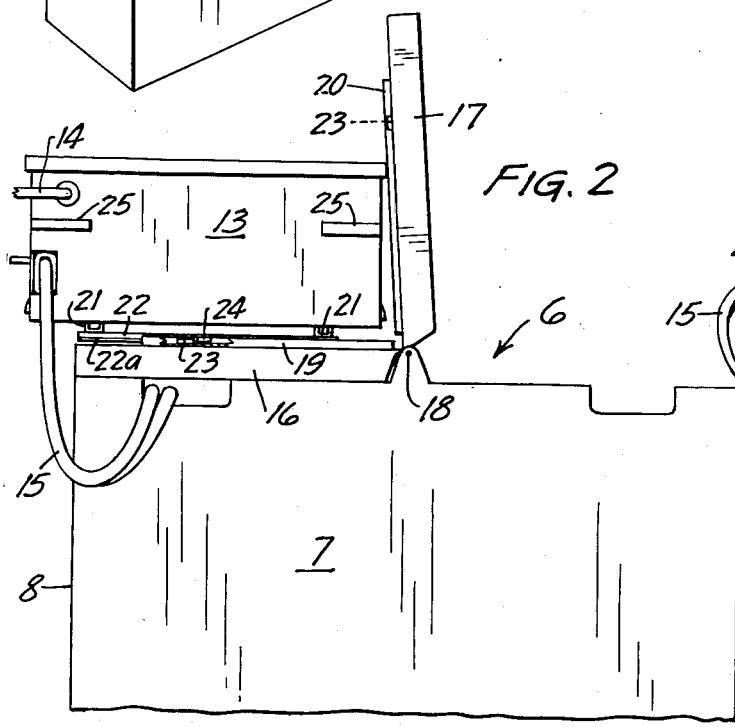
FIG. 2 is a side elevational view showing the charger in one of its end positions and with one of the cover sections of the housing in open position.

When the battery 5 is to be recharged the free terminal of the cord is merely plugged into a suitable power outlet. To gain access to the battery elements beneath the cover section 17, it is only necessary to slide the charger 13 to position above the other cover section 16 and then to open the cover section 17, as indicated in FIG. 2. Similarly, to gain access to the cells beneath the cover section 16, the cover section 17 is closed and the charger is moved from the rail member 19 to a position above the member 20, thereby freeing the cover section 16 to be swung to open position. Servicing of the battery is thus facilitated and removal of the charger from the battery obviated. It will be evident that heat generated during the charging operation is readily dissipated from the top of a battery compartment and there is no substantial transfer of heat from the charger to the battery. When the charger is not in operation, the power cord 14 may be wound on bracket members 25.

We claim:

1. A charger mounting comprising, a storage battery housing, a cover for said housing having a plurality of normally horizontal, relatively movable sections for severally allowing access to interior portions of said housing when in open position, elongated guide means fixed on the normally upper sides of the several cover sections and extending end to end in continuation one with another when said cover sections are in closed positions, and connecting means fixed on the bottom of the charger and slidably engaging said guide means the charger being movable along said guide means from a position above one of said cover sections to a position above the other cover section.

2. A charger mounting in accordance with claim 1 wherein said housing is elongated and each of said cover sections are adapted to cover approximately half of the housing and to extend longitudinally thereof, and means hingedly connecting the several cover sections to said housing.

3. A charger mounting in accordance with claim 1 in which said guide means comprise rail members each having a flange extending in parallel relation to the upper surface of one of said cover sections.

4. A charger mounting in accordance with claim 3 in which said connecting means comprise rail members each having a flange fitting in sliding engagement with and extending in parallel relation to a flange of a rail member of said guiding means.

5. A charger mounting comprising, a storage battery housing, a cover for said housing having a plurality of normally horizontal, relatively movable sections for severally allowing access to interior portions of said housing when in open position, means hingedly connecting said cover sections to the housing, guide rails fixed on the normally upper sides of the several cover sections and extending end to end in continuation one with another when said cover sections are in closed position, and connecting means projecting from the bottom of the charger for engaging said guide rails, the charger being movable along said guide rails from a position above one of said cover sections to a position above the other cover section.

6. A charger mounting in accordance with claim 5 in which each of said cover sections is provided with a fixed end stop for limiting movement of the charger along said rails and the charger is provided with a stop member adapted to coact with said end stops for limiting movement of the charger along said rails.

7. A charger mounting in accordance with claim 5 in which each of said guide rails has a flange extending in parallel relation to the upper surface of one of said cover sections.

8. A charger mounting in accordance with claim 7 in which said connecting means comprise rail members each having a flange fitting in sliding engagement with the lower side of one of said flanges of a guide rail.

References Cited in the file of this patent

UNITED STATES PATENTS

| | | |
|---|---|---|
| 224,490 | Sturges | Feb. 10, 1880 |
| 895,640 | Hullhorst | Aug. 11, 1908 |
| 2,300,303 | Morrison | Oct. 27, 1942 |
| 2,865,684 | Meyer | Dec. 23, 1958 |